(12) United States Patent
Andersson

(10) Patent No.: US 10,807,414 B2
(45) Date of Patent: Oct. 20, 2020

(54) ANTI-SKID ARRANGEMENT WITH PROTECTIVE MEMBER

(71) Applicant: VBG GROUP AB (PUBL), Vänersborg (SE)

(72) Inventor: Ragnvald Andersson, Grästorp (SE)

(73) Assignee: VBG GROUP AB (PUBL), Vänersborg (SE)

( * ) Notice: Subject to any disclaimer, the term of this patent is extended or adjusted under 35 U.S.C. 154(b) by 54 days.

(21) Appl. No.: 16/333,072

(22) PCT Filed: Sep. 14, 2017

(86) PCT No.: PCT/EP2017/073134
§ 371 (c)(1),
(2) Date: Mar. 13, 2019

(87) PCT Pub. No.: WO2018/050744
PCT Pub. Date: Mar. 22, 2018

(65) Prior Publication Data
US 2019/0263176 A1    Aug. 29, 2019

(30) Foreign Application Priority Data

Sep. 15, 2016  (EP) .................... 16189019

(51) Int. Cl.
*B60B 39/00* (2006.01)
*B21D 28/26* (2006.01)

(52) U.S. Cl.
CPC ............ *B60B 39/003* (2013.01); *B21D 28/26* (2013.01); *B60B 2900/551* (2013.01); *B60B 2900/721* (2013.01)

(58) Field of Classification Search
CPC ...... F16C 33/805; B21D 28/26; B60B 39/003; B60B 2900/551; B60B 2900/721
(Continued)

(56) References Cited

U.S. PATENT DOCUMENTS 2,543,876 A    3/1951  Smith
4,299,310 A *  11/1981 Torneback ............ B60B 39/003
                                                      188/4 R
(Continued)

OTHER PUBLICATIONS

International Search Report issued in corresponding PCT Application No. PCT/EP2017/073134, dated Nov. 20, 2017, pp. 1-2.
(Continued)

*Primary Examiner* — Ruth Ilan
(74) *Attorney, Agent, or Firm* — Murtha Cullina LLP

(57) ABSTRACT

An anti-skid arrangement including a friction wheel with several chains intended to be thrown under a tire in order to increase friction between the tire and the ground, and an operating arm rotatably connected to the friction wheel, wherein the operating arm is adapted to be connected to the vehicle and to bring the friction wheel into frictional engagement with the tire. The anti-skid arrangement also includes a protective member having an inner part arranged around a rotation axis of the friction wheel and between the friction wheel and the operating arm, and an outer part with two side walls abutting against opposite sides of the operating arm. The protective member prevents the chains from getting stuck between the friction wheel and the operating arm, and is simple to produce.

13 Claims, 5 Drawing Sheets

(58) Field of Classification Search
USPC .............. 280/757; 188/4 R; 152/214; 403/23
See application file for complete search history.

(56) References Cited

U.S. PATENT DOCUMENTS

| | | | | |
|---|---|---|---|---|
| 4,745,993 | A * | 5/1988 | Schulz .................. | B60B 39/003 152/208 |
| 7,766,387 | B1 * | 8/2010 | Rosenbalm ........... | B60B 39/003 152/214 |
| 2011/0146866 | A1 * | 6/2011 | Jafari Valilou ....... | B60B 39/003 152/214 |
| 2019/0263175 | A1 * | 8/2019 | Andersson .............. | B60C 27/02 |

OTHER PUBLICATIONS

Anonymous "Bob Johnson's Toughbook Stuff: Company Spotlight: OnSpot Automatic Tire Chains," Dec. 12, 2011, pp. 1-2, retrieved from internet.

* cited by examiner

ANTI-SKID ARRANGEMENT WITH PROTECTIVE MEMBER

TECHNICAL FIELD

The present invention relates to an anti-skid arrangement having a protective member and to a method for producing such a protective member.

BACKGROUND OF THE INVENTION

Trucks, buses and emergency vehicles are examples of vehicles that for safety and other reasons may be equipped with various types of anti-skid arrangements that enhance traction and braking in slippery road conditions caused by for example snow and ice. A common type of anti-skid arrangement utilizes chains that can be engaged under the tread of a tire to improve road grip. The chains are mounted on a friction wheel which is connected to the underside of the vehicle via an operating arm. The operating arm can swing the wheel into and out of a position in which wheel abuts against the side of the tire, the rotation of which causes the wheel to rotate and the chains to be thrown in under the tread of the tire.

There is a risk of damage to the anti-skid arrangement caused by a chain getting stuck between the wheel and the operating arm, and various techniques for preventing this from happening are known in the art. For example, it is known to use a protective member in the form of a plastic lid which covers the wheel and which has two protruding tabs between which the operating arm is positioned. An example of such a protective member is the "Helmet" sold by Onspot North America.

While technically and aesthetically satisfactory, such solutions are considered too expensive. A simpler alternative is to use a separate protective member in the form of a U-shaped clip. The clip is pressed onto the operating arm towards the friction wheel, such that the legs of the clip thereby cover the space between the wheel and the operating arm.

While this solution is very inexpensive, it typically requires manual adjustment depending on the distance between the friction wheel and the operating arm. Hence, there exists a need for an inexpensive protective member that fits most anti-skid devices without manual adjustment.

A discussion of an example of an anti-skid arrangement can be found in WO 2007/068466. A power unit adapted to move a rotor carrying traction chains into and out of contact with a tire of an automobile is disclosed in U.S. Pat. No. 2,543,876.

SUMMARY OF THE INVENTION

In view of the above-mentioned need, and according to a first aspect, there is presented an anti-skid arrangement for a vehicle with tires comprising a friction wheel having mounted thereon several chains intended to be thrown under a tire in order to increase friction between the tire and the ground; and an operating arm rotatably connected to the friction wheel, wherein the operating arm is adapted to be connected to the vehicle and to bring the friction wheel into frictional engagement with the tire. The anti-skid arrangement has a protective member comprising an inner part arranged around a rotation axis of the friction wheel and between the hub and the arm, wherein an extension of the inner part in a radial direction is less than 50% of a radius of the friction wheel. The protective member also comprises an outer part having a longitudinal extension radially away from the rotation axis, wherein a transverse extension of the outer part in a plane perpendicular to the rotation axis is substantially limited to a width of the operating arm parallel to the plane, and wherein the outer part further has two side walls substantially perpendicular to the plane and abutting against opposite sides of the operating arm.

According to a second aspect, there is presented a method for manufacturing a protective member for an anti-skid arrangement, the anti-skid arrangement comprising a friction wheel having mounted thereon several chains intended to be thrown under a tire of a vehicle in order to increase friction between the tire and the ground, the friction wheel further being rotatably connected to an operating arm adapted to be connected to the vehicle and to bring the friction wheel into frictional engagement with the tire, wherein the protective member is intended to be mounted at an axis of rotation of the friction wheel in order to prevent items being introduced in a space between the friction wheel and the operating arm. The method comprises: providing a flat T-shaped piece, the T-shaped piece having a leg and a head, the head having two side portions and an intermediate portion located between the side portions; bending the side portions towards each other to form two side walls extending substantially perpendicularly from the intermediate portion; and forming a hole in the leg. The method may further comprise a step of punching the leg so that a central zone surrounding the hole is pressed out of a plane of the leg.

By the two side walls being "substantially perpendicular" to the plane is meant that each side wall makes an angle with the plane which is 90 degrees or which differs from 90 degrees by less than 20 degrees, alternatively less than 10 degrees or less than 5 degrees. This is also how the two side walls extending "substantially perpendicularly" from the intermediate portion should be understood.

By the transverse extension of the outer part being "substantially limited" to the width of the operating arm is meant that the transverse extension of the outer part is less than 20% greater than the width of the operating arm, alternatively less than 15%, less than 10% or less than 5%.

The protective member described above helps to prevent the chains, as well as other items thrown up from the road surface, from getting stuck between the friction wheel and the operating arm. The protective member is simple and fast to produce using standard tools and inexpensive materials. Integrating the protective member with existing types of anti-skid arrangement requires only very minor changes to the production process thereof. The protective member is also robust and reliable, thereby ultimately reducing end-user costs.

Further, a protective member according the present invention will fit anti-skid devices having different distances between the friction wheel and the operating arm. It also allows slight movement between the operating arm and the friction wheel during operation.

The extension of the inner part in the radial direction may be less than 20%, and preferably less than 10%, of the extension of the friction wheel in the radial direction.

The friction wheel may comprise a bearing arranged on the rotation axis, an inner race of the bearing being fixed relative to the operating arm. The inner part may have a central zone abutting against the inner race and a peripheral zone separated from the friction wheel in a direction parallel to the rotation axis. A particularly fast and simple way of providing such a central zone and peripheral zone is by punching the inner part.

The inner part may be adapted to act as a protective cover for the bearing. There is usually a protective cover, for example a washer, arranged between the operating arm and the bearing. Adapting the inner part to act as the protective cover reduces the number of components of the anti-skid arrangement, something which may reduce costs as well as simplify the production process.

It is especially advantageous to make the protective member out of a material that is capable of plastic deformation, for example sheet metal. Using such a material facilitates the provision of a protective member having precisely the desired shape, and it is possible to use simple tools.

It is noted that the invention relates to all possible combinations of features recited in the claims.

BRIEF DESCRIPTION OF THE DRAWINGS

The present invention will now be described in more detail with reference to the appended drawings.

DETAILED DESCRIPTION

Figure 1A:
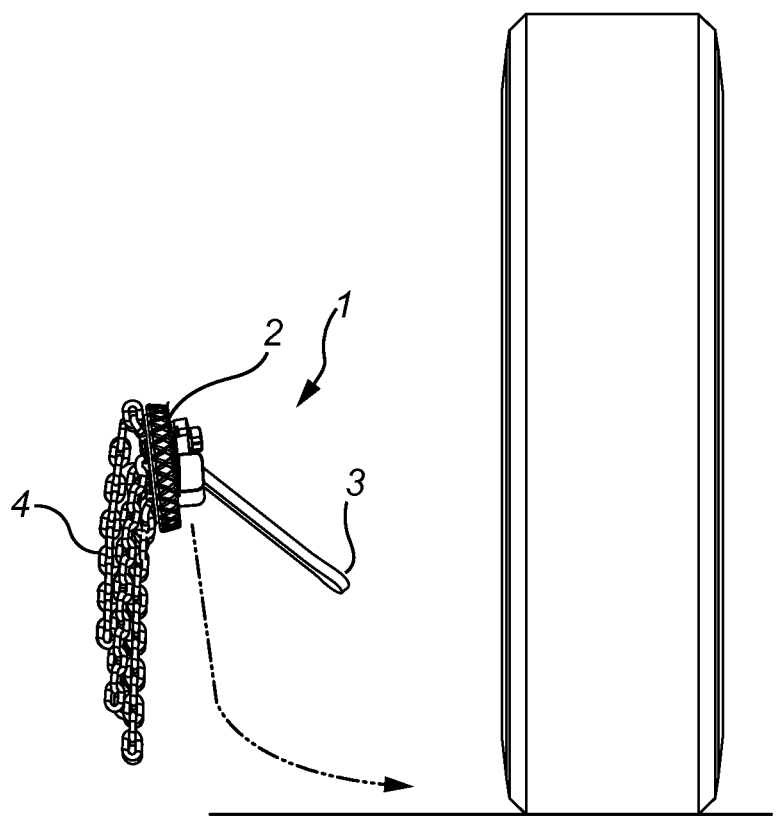
FIGS. 1a and 1b show an anti-skid arrangement, according to an example embodiment of the invention, during use.
Figure 1B:
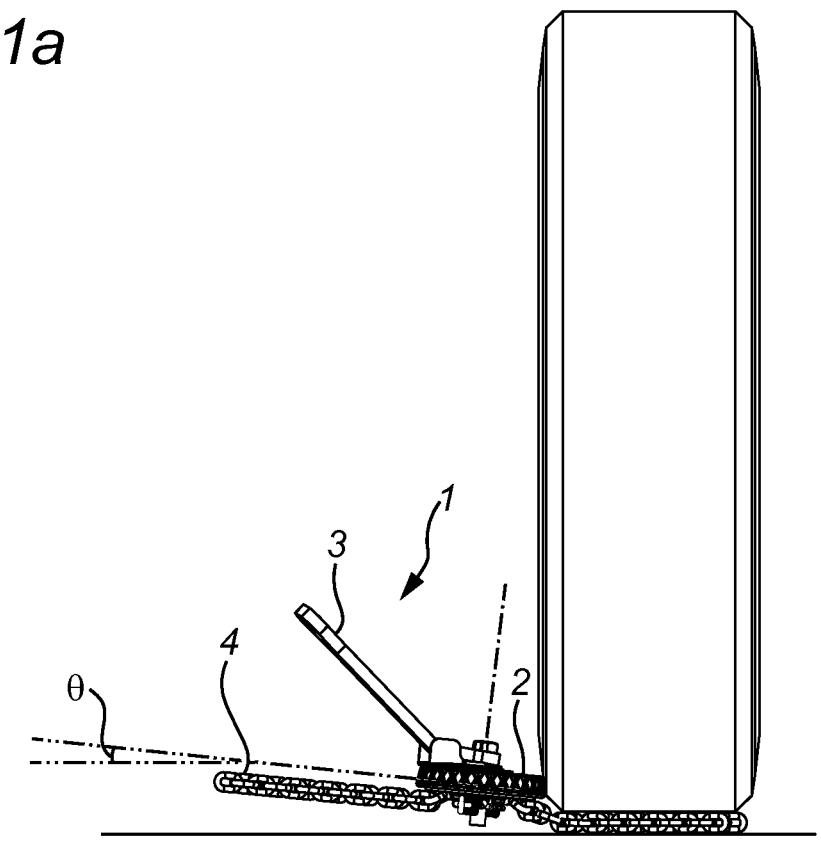

FIGS. 1a and 1b show an anti-skid arrangement 1 which is mounted to the underside of a vehicle (not shown) and which is movable between an inactive position (see FIG. 1a) and an active position (see FIG. 1b). The anti-skid arrangement 1 has a circular friction wheel 2. In the inactive position, the friction wheel 2 is not in frictional engagement with a tire of the vehicle, whereas, in the active position, the friction wheel 2 is in frictional engagement with a tire of the vehicle. Typically, the vehicle is provided with a system that enables the driver of the vehicle to activate the anti-skid arrangement 1 by pushing a button on a dashboard inside the vehicle. Upon activation, an operating arm 3 mounted to the vehicle and the friction wheel 2 moves so that the friction wheel 2 is brought into frictional engagement with a rotating tire. The operating arm 3 is thus mounted to the vehicle so that the anti-skid arrangement 1 is movable between the active position and the inactive position. The operating arm 3 may for example be pivotally mounted to the vehicle. The frictional engagement between the tire and the friction wheel 2 causes the friction wheel 2 to start to rotate and chains 4 mounted to the friction wheel 2 to be flung radially outwards by the centrifugal force and successively drawn in under the tire tread.

Usually, the vehicle has two anti-skid arrangements 1 arranged to cooperate with a respective one of two oppositely arranged tires. The tires to which the friction wheels 2 are brought into contact are preferably driving tires for maximum increase in road grip. Also, the plane in which the friction wheel 2 rotates advantageously makes an angle θ with the horizontal as the chains 4 are then less likely to be dragged along the ground when they are not underneath the tire.

Figure 2:
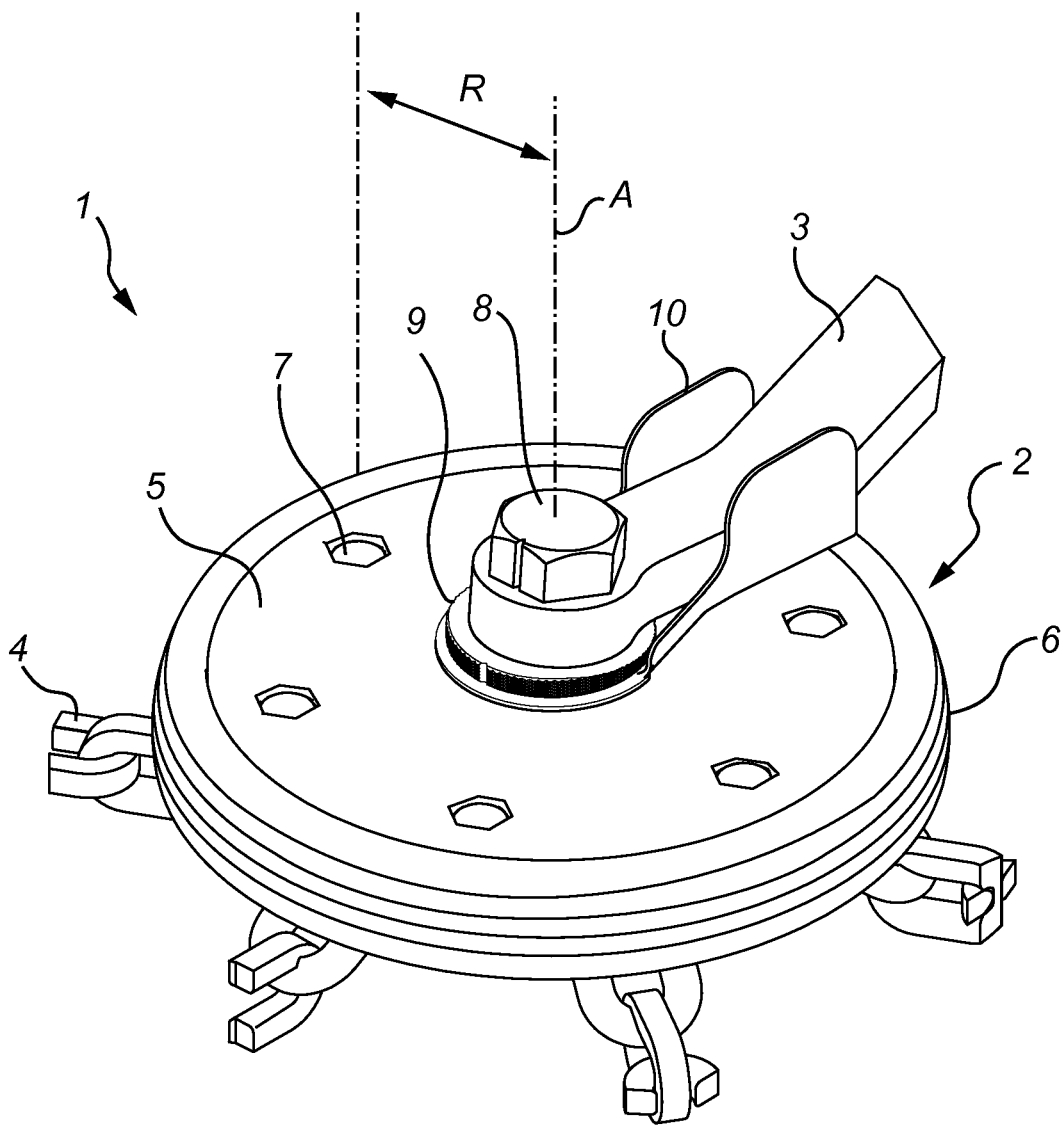
FIG. 2 shows a perspective view of the anti-skid arrangement in FIGS. 1a and 1b.
Figure 3:
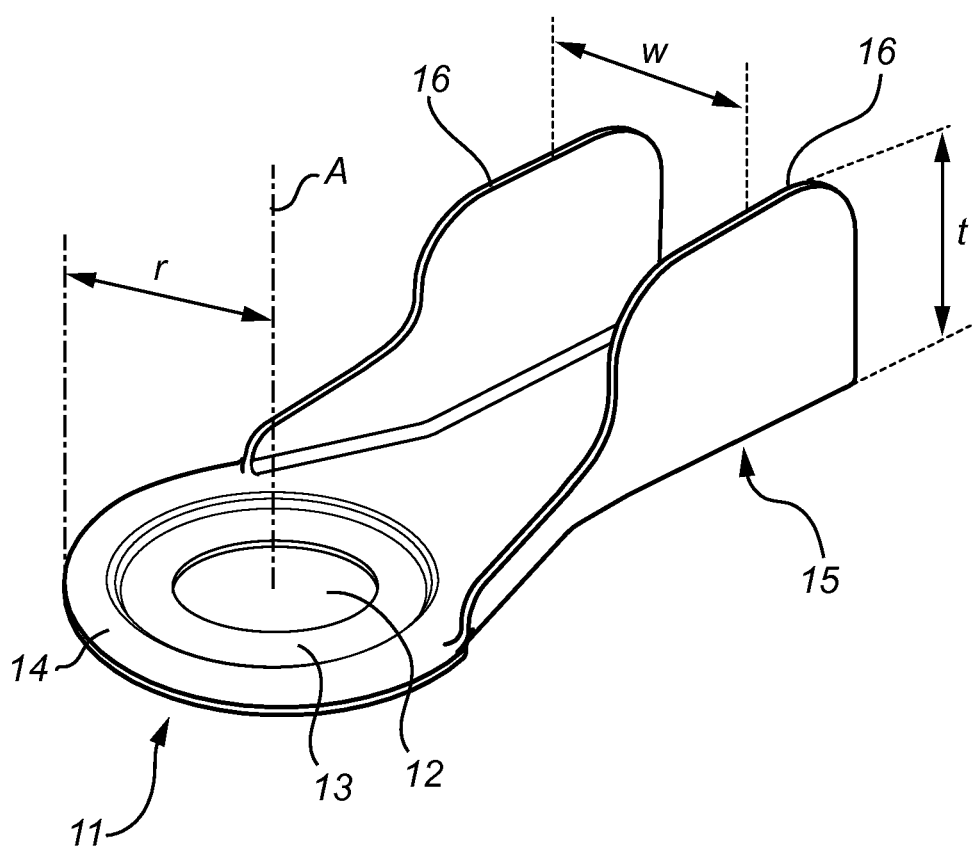
FIG. 3 shows a perspective view of the protective member in FIG. 2.

With reference to FIGS. 2 and 3, the anti-skid arrangement 1 will now be described in more detail. The radius R of the friction wheel 2 is typically in the range 60-120 mm. The friction wheel 2 is rotatable about a rotation axis A. The friction wheel 2 comprises a circular hub 5. The hub 5 is made of a hard and durable material, typically a metal, such as steel or aluminum.

A ring 6 is attached around the hub 5. The ring 6 may for example be vulcanized to the hub 5. Alternatively, the ring 6 may be clamped by the hub 5. In such case the hub 5 typically comprises an upper part and a lower part which are adapted to clamp the ring 6. During use of the anti-skid arrangement 1, the ring 6 abuts against the side of a tire. The ring 6 is thus intended to be brought in frictional engagement with a tire. The ring 6 is therefore typically made of a high-friction material, such as rubber or a similar material. Further, the outer surface of the ring 6, i.e. the surface of the ring 6 that intended to be in contact with a tire, may have a patterned structure for improved grip with the tire. The pattern may for example be formed by ribs, ridges, recesses and/or protrusions. In the illustrated example, the outer surface of the ring 6, is inclined with respect to the rotation axis A of the friction wheel 2. More precisely, the outer surface is curved radially inward as seen in the upward direction in FIG. 2. The reason for this is that the friction wheel 2 is typically inclined with respect to the horizontal when in contact with the tire, because the chains 4 are then less likely to drag along the ground during the part of their rotation where they are not underneath the tire, and making the outer surface of the tire slightly inclined too may increase the contact area, and hence the frictional engagement, between the ring 6 and the tire.

The chains 4 are mounted to the lower side of the hub 5 as seen in FIG. 2, for example via an annular plate attached the hub 5. All of the chains 4 have substantially the same length which typically is in the order of a few dm. The chains 4 are made of a hard material that is capable of withstanding substantial wear and tear, such as steel. Several screws 7 clamp the hub 5 and the plate with the chains 4 together. Nuts may be threaded onto the screws 7 at the lower side of the hub 5. In the illustrated example, the heads of the screws 17 are lowered into fixating holes in the upper part 6b, facilitating mounting of the nuts. Alternatively, the screws 7 may be self-tapping screws engaging pre-drilled holes in the hub 5.

The operating arm 3 is mounted to the upper side of the hub 5 as seen in FIG. 2, i.e. the side opposite to the side where the chains 4 are mounted to the hub 5. Depending on the application, the operating arm 3 may comprise several straight and bent portions. The friction wheel 2 is rotatably mounted to the operating arm 3 at the rotation axis A. A central bolt 8 extending along the rotation axis A through the hub 5 holds the operating arm 3 and the friction wheel 2 together.

A washer 9 and a protective member 10 are arranged between the operating arm 3 and the friction wheel 2. The washer 9 is arranged between the protective member 10 and the operating arm 3, so the protective member 10 is arranged between the friction wheel 2 and the washer 9. The protective member 10 helps to "close" the space between friction wheel 2 and the operating arm 3 so that the chains 4, as well as other items such as dirt, ice, etc., thrown up from the road surface, do not get stuck in the space between the friction wheel 2 and the operating arm 3. The washer 9 may in some embodiments be wedge-shaped and cooperate with a bent central bolt 8 in the manner described in the Swedish patent with publication number SE 503505.

As can be clearly seen in FIG. 3, the protective member 10 has an inner part 11 arranged around the rotation axis A.

A hole 12 is provided in the inner part 11. The outer radius r of the inner part 11 is less than 50% of the radius R of the friction wheel 2. The inner part 11 has an annual, radially central zone 13 which surrounds the hole 12. A peripheral zone 14 surrounds the central zone 13. In the illustrated example, the central zone 13 has been axially displaced relative to the peripheral zone 14. Thus, the central zone 13 and the peripheral zone 14 do not lie in the same plane. With this design, the central zone 13 may abuts against the inner race of a bearing (not shown) which is arranged inside the hub 5 and which enables the friction wheel 2 to rotate relative to the operating arm 2 and the protective member 10. The inner part 11 may then act as a protective cover for the bearing. In other examples, a washer, or the like, arranged between the inner part 11 and the friction wheel 2, may instead act as a protective cover for the bearing or there may be no such protective cover. It should be noted that there may be a total of more than one bearing, for example two bearings, arranged inside the hub 5, around the bolt 8, so as to enable the friction wheel 2 to rotate relative to the operating arm 3.

The protective member 10 further comprises an outer part 15 which extends radially way from the rotation axis A. The transverse extension w of the outer part 15 in a plane perpendicular to the rotation axis A is substantially limited to the width of the operating arm 3 as measured parallel to that plane. The outer part 15 has two oppositely arranged side walls 16, or tabs. The side walls 16 extend substantially parallel to the rotation axis A. The operating arm 3 is positioned between the side walls 16. The operating arm 3 is thus flanked by the side walls 16. The height t of the side walls 16 in the direction of the rotation axis A may for example be in the range of 1-4 cm.

Figure 4:
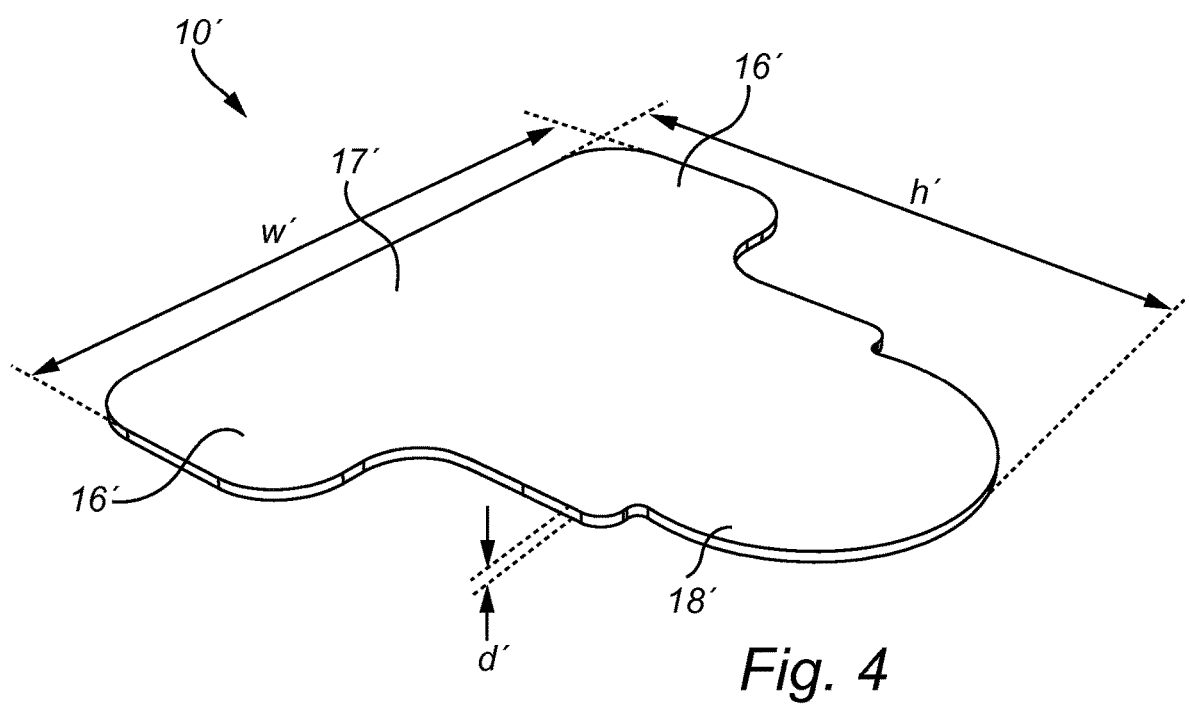
FIG. 4 shows a perspective view of the protective member in FIG. 3 in an unbent state.
Figure 5:
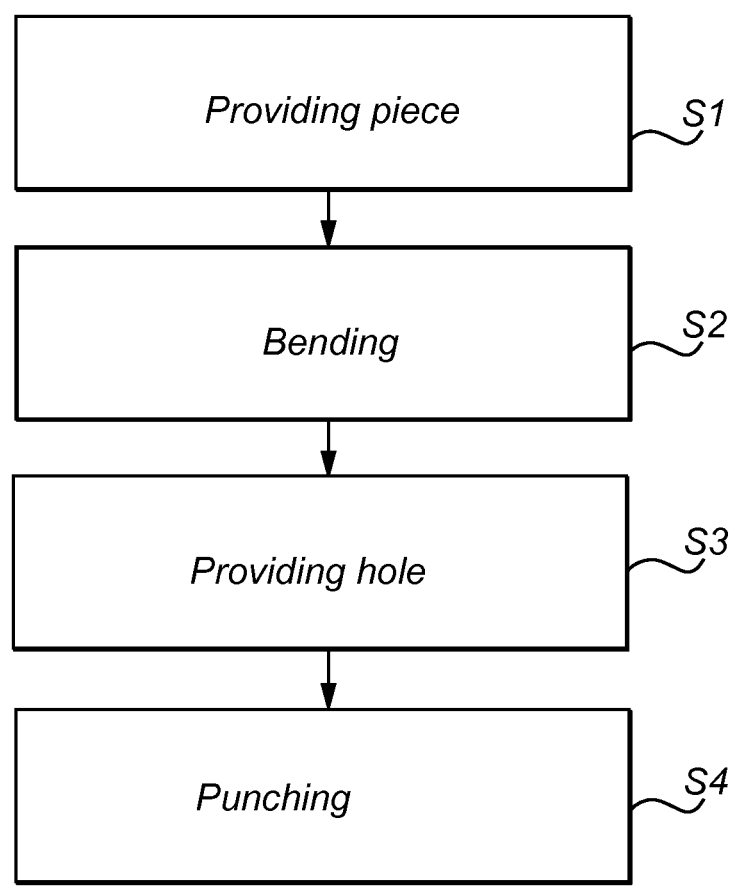
FIG. 5 shows a flowchart of a method for producing the protective member in FIG. 3.

With reference to FIGS. 4 and 5, and with continued reference to FIG. 3, a method of producing the protective member 10 will now be described.

At step S1, a flat, T-shaped piece 10' is provided. The T-shaped piece 10' may be referred to as the protective member 10 in an unbent state. The T-shaped piece 10' may have been cut from a large sheet. The T-shaped piece 10' is typically made of a material capable of plastic deformation, for example a sheet metal. The T-shaped piece 10' has a head with two side portions 16' and an intermediate portion 17' which is located between the side portions 16'. The T-shaped piece also has a leg 18' which is joined with the head at the intermediate portion 17'. The leg 18', the side portions 16' and the intermediate portion 17' are all generally rectangular in the illustrated example. The height h' and width w' of the T-shaped piece 10' may for example be in the order of 10 cm. The thickness d' of the T-shaped piece 10' may for example be in the order of 1 mm.

At step S2, the side portions 16' are bent toward each other so as to form a respective angle with respect to the intermediate portion 17'. The angle that each side portion makes with the intermediate portion 17' is substantially 90 degrees. By bending the side portions 16' in this way, the side portions 16' form the side walls 16 of the protective member 10 in the bent state. The protective member 10 in the bent state is illustrated in FIG. 3.

At step S3, a hole 12 is provided in the leg 18'. The hole 12 is usually made close to the end of the leg 18' that is distal to the head.

At step S4, the leg 18' is punched so that a central zone 13 surrounding the hole 12 is pressed out of a plane of the leg 18'.

The person skilled in the art realizes that the present invention by no means is limited to the above-described example embodiments. Many modifications and variations are possible within the scope of the appended claims. For example, steps S3 and S4 may occur simultaneously, i.e. the making of the hole 12 and the punching of the leg 18' can be performed in one and the same action.

The word "comprising" does not exclude the presence of other elements or steps than those listed in the claim. The word "a" or "an" preceding an element does not exclude the presence of a plurality of such elements.

What is claimed is:

1. An anti-skid arrangement for a vehicle with tires, wherein the anti-skid arrangement comprises:
   a friction wheel having mounted thereon several chains intended to be thrown under a tire in order to increase friction between the tire and the ground, and
   an operating arm rotatably connected to the friction wheel, wherein the operating arm is adapted to be connected to the vehicle and to bring the friction wheel into frictional engagement with the tire,
   wherein:
   a protective member comprising:
      an inner part arranged around a rotation axis of the friction wheel and between the friction wheel and the operating arm, wherein an extension of the inner part in a radial direction is less than 50% of a radius of the friction wheel, and
      an outer part having a longitudinal extension radially away from the rotation axis, wherein a transverse extension of the outer part in a plane perpendicular to the rotation axis is substantially limited to a width of the operating arm parallel to said plane, and wherein the outer part further has two side walls substantially perpendicular to said plane and abutting against opposite sides of the operating arm.

2. The anti-skid arrangement according to claim 1, wherein the extension of the inner part in said radial direction is less than 20% of the extension of the friction wheel in the radial direction.

3. The anti-skid arrangement according to claim 2, wherein the extension of the inner part in said radial direction is less than 10% of the extension of the friction wheel in the radial direction.

4. The anti-skid arrangement according to claim 2, wherein the friction wheel comprises a bearing arranged on the rotation axis, an inner race of the bearing being fixed relative to the operating arm, and wherein the inner part has a central zone abutting against the inner race and a peripheral zone separated from the friction wheel in a direction parallel to the rotation axis.

5. The anti-skid arrangement according to claim 4, wherein the central zone and the peripheral zone have been formed by punching the inner part.

6. The anti-skid arrangement according to claim 4, wherein the inner part is adapted to act as a protective cover for the bearing.

7. The anti-skid arrangement according to claim 1, wherein the protective member is made of a material capable of plastic deformation.

8. The anti-skid arrangement of claim 7, wherein the protective ember is made of sheet metal.

9. The anti-skid arrangement according to claim 1, wherein the protective member has been formed by bending a single, flat piece from an unbent state to a bent state.

10. The anti-skid arrangement according to claim 9, wherein, in the unbent state, said piece is T-shaped and has a leg and a head, the head having two side portions and an intermediate portion located between the side portions, wherein, in the bent state, each side portion forms a substantially perpendicular angle with the intermediate portion, whereby the side portions form the side walls in the bent state.

11. A method for manufacturing a protective member for an anti-skid arrangement, the anti-skid arrangement comprising a friction wheel having mounted thereon several chains intended to be thrown under a tire of a vehicle in order to increase friction between the tire and the ground, the friction wheel further being rotatably connected to an operating arm adapted to be connected to the vehicle and to bring the friction wheel into frictional engagement with the tire, wherein the protective member is mounted at a rotation axis of the friction wheel in order to prevent items being introduced in a space between the friction wheel and the operating arm, wherein the method comprises:
  providing a flat T-shaped piece, the T-shaped piece having a leg and a head, the head having two side portions and an intermediate portion located between the side portions;
  bending the side portions towards each other to form two side walls extending substantially perpendicularly from the intermediate portion; and
  forming a hole in the leg.

12. The method according to claim 10, further comprising punching the leg so that a central zone surrounding the hole is pressed out of a plane of the leg.

13. The method according to claim 12, wherein the punching of the leg and the forming of the hole are performed in one single punching action.

* * * * *